United States Patent [19]
Benjamin et al.

[11] Patent Number: 6,113,208
[45] Date of Patent: Sep. 5, 2000

[54] REPLACEABLE CARTRIDGE FOR A PRINTER INCLUDING RESIDENT MEMORY WITH STORED MESSAGE TRIGGERING DATA

[75] Inventors: Trudy Benjamin, Portland, Oreg.; Winthrop D. Childers, San Diego, Calif.; James P. Axtell, Portland, Oreg.; Michael L. Bullock, San Diego, Calif.; Kerry Trent Christensen, Boise, Id.

[73] Assignee: Hewlett-Packard Company, Palo Alto, Calif.

[21] Appl. No.: 08/856,262

[22] Filed: May 14, 1997

Related U.S. Application Data

[63] Continuation-in-part of application No. 08/651,221, May 22, 1996, Pat. No. 5,682,140, and application No. 08/845,800, Apr. 25, 1997, Pat. No. 5,930,553.

[51] Int. Cl.⁷ .............................. B41J 2/195; G03G 15/00
[52] U.S. Cl. .................................................. 347/7; 399/12
[58] Field of Search ................................. 340/540; 347/7, 347/19, 25, 86, 900; 399/2, 12, 13, 24, 25, 27, 29, 77

[56] References Cited

U.S. PATENT DOCUMENTS

| | | |
|---|---|---|
| 4,551,000 | 11/1985 | Kanemitsu et al. . |
| 4,803,521 | 2/1989 | Honda . |
| 4,961,088 | 10/1990 | Gilliland et al. . |
| 5,021,828 | 6/1991 | Yamaguchi . |
| 5,049,898 | 9/1991 | Arthur et al. . |
| 5,138,344 | 8/1992 | Ujita . |
| 5,184,181 | 2/1993 | Kurando et al. . |
| 5,272,503 | 12/1993 | LeSueur et al. . |
| 5,365,312 | 11/1994 | Hillmann et al. . |
| 5,410,641 | 4/1995 | Wakabayashi et al. . |
| 5,506,611 | 4/1996 | Ujita et al. . |
| 5,610,635 | 3/1997 | Murray et al. . |
| 5,682,140 | 10/1997 | Christensen et al. ................... 340/540 |
| 5,930,553 | 7/1999 | Hirst et al. .................................. 399/8 |

FOREIGN PATENT DOCUMENTS

| | | |
|---|---|---|
| 0 541 064 A2 | 5/1993 | European Pat. Off. . |
| 0 743 567 A2 | 5/1993 | European Pat. Off. . |
| 0720916A2 | 1/1996 | European Pat. Off. . |
| 07227971 | 8/1995 | Japan . |
| 07322032 | 12/1995 | Japan . |
| WO 96/05061 | 2/1996 | WIPO . |

*Primary Examiner*—Arthur T. Grimley
*Assistant Examiner*—Hoang Ngo

[57] ABSTRACT

A method for controlling an inkjet apparatus employs a pluggable module which includes a memory, the inkjet apparatus being connected to a computer/display arrangement. The method includes the steps of: determining when the pluggable module has been installed in the inkjet apparatus; determining if a printer driver indication in the module memory notes a newer driver procedure than the current driver procedure being used with the inkjet apparatus; and if yes, displaying a message indicating availability of the newer driver procedure. The method further enables the occurrence of a low ink indication from a pluggable ink module to automatically cause the display of a reorder message. The method also enables any selected message included in the memory to be automatically displayed upon insertion of the pluggable module.

33 Claims, 6 Drawing Sheets

DRIVER UPDATE

DRIVER UPDATE

REPLACEABLE CARTRIDGE FOR A PRINTER INCLUDING RESIDENT MEMORY WITH STORED MESSAGE TRIGGERING DATA

This Application is a Continuation-In-Part of application Ser. No. 08/651,221, filed May 22, 1996, now U.S. Pat. No. 5,682,140 and application Ser. No. 08/845,800, filed Apr. 25, 1997, now U.S. Pat. No. 5,930,553.

FIELD OF THE INVENTION

This invention relates to printers and, more particularly, to a replaceable consumable part therefor with a resident memory which includes means for causing a message or messages to be triggered for display upon occurrence of an event or upon installation of the part.

BACKGROUND OF THE INVENTION

Substantially all present-day copiers, printers, plotters, etc., require entry of usage, calibration and other data. In regards to ink jet printers, it has been proposed that printheads incorporate a parameter memory for storage of operating parameters to be used by the printer for calibration purposes. Such parameters include: drop generator driver frequency, ink pressure and drop charging values (see "Storage of Operating Parameters in Memory Integral with Print Head", Lonis, Xerox Disclosure Journal, Volume 8, No. 6, November/December 1983, page 503).

U.S. Pat. No. 5,138,344 to Ujita, entitled "Ink Jet Apparatus and Ink Jet Cartridge Therefor", indicates that an ink-containing replaceable cartridge can be provided with an integral information device (i.e., a resistor element, magnetic medium, bar code, integrated circuit or ROM), for storage of information relating to control parameters for an ink jet printer.

U.S. Pat. No. 5,365,312 to Hillmann et al., entitled "Arrangement for Printer Equipment Monitoring Reservoirs that Contain Printing Medium", describes the use of memory devices with integral ink reservoirs for storage of ink consumption data (for use by a coupled ink jet printer). European patent EP 0 720 916, entitled "Ink Supply Identification System for a Printer" describes the use of an ink supply having an integral EEPROM which is utilized to store data regarding the identity of the ink supply and its fill level.

The prior art further teaches the use of consumable parts with integral memory for use in electrophotographic printers. In U.S. Pat. No. 5,021,828 to Yamaguchi et al., entitled "Copying Apparatus having a Consumable Part", a toner cartridge is disclosed which includes a memory for storing data regarding to the state of consumption of toner in the cartridge. U.S. Pat. Nos. 4,961,088 to Gilliland et al.; 4,803,521 to Honda; 5,184,181 to Kurando et al.; and 5,272,503 to LeSueur et al. all describe various replaceable toner cartridges for use in electrophotographic printers. Each cartridge incorporates a memory device for storing parameter data regarding the cartridge.

Ink jet printers, consumables therefor and software usable therewith are continuously being improved. A continuing problem in the marketing of such devices, consumables and software is informing the purchasing public of the improvements, their availability, price, and how they relate to both currently and previously available products. Further, when a consumable is exhausted, the user must either have a readily available replacement or know where to go to acquire a replacement. Often, data regarding sources for replacements is contained in manuals and pamphlets which accompany the consumable and which are easily mislaid or lost.

Accordingly, it is an object of this invention to provide a replaceable cartridge for use in an ink jet apparatus, which cartridge includes memory with a user message trigger that triggers communication of a user message and is activated upon the occurrence of an event.

It is another object of this invention to provide a replaceable cartridge for use in an ink jet apparatus, which cartridge includes memory with a user message that is displayed upon installation of the cartridge.

SUMMARY OF THE INVENTION

A method for controlling an inkjet apparatus employs a pluggable module which includes a memory, the inkjet apparatus being connected to a computer/display arrangement. The method includes the steps of: determining when the pluggable module has been installed in the inkjet apparatus; determining if a printer driver indication in the module memory notes a newer driver procedure than the current driver procedure being used with the inkjet apparatus; and if yes, displaying a message indicating availability of the newer driver procedure. The method further enables the occurrence of a low ink indication from a pluggable ink module to automatically cause the display of a reorder message. The method also enables any selected message included in the memory to be automatically displayed upon insertion of the pluggable module.

DETAILED DESCRIPTION OF THE INVENTION

Figure 1:
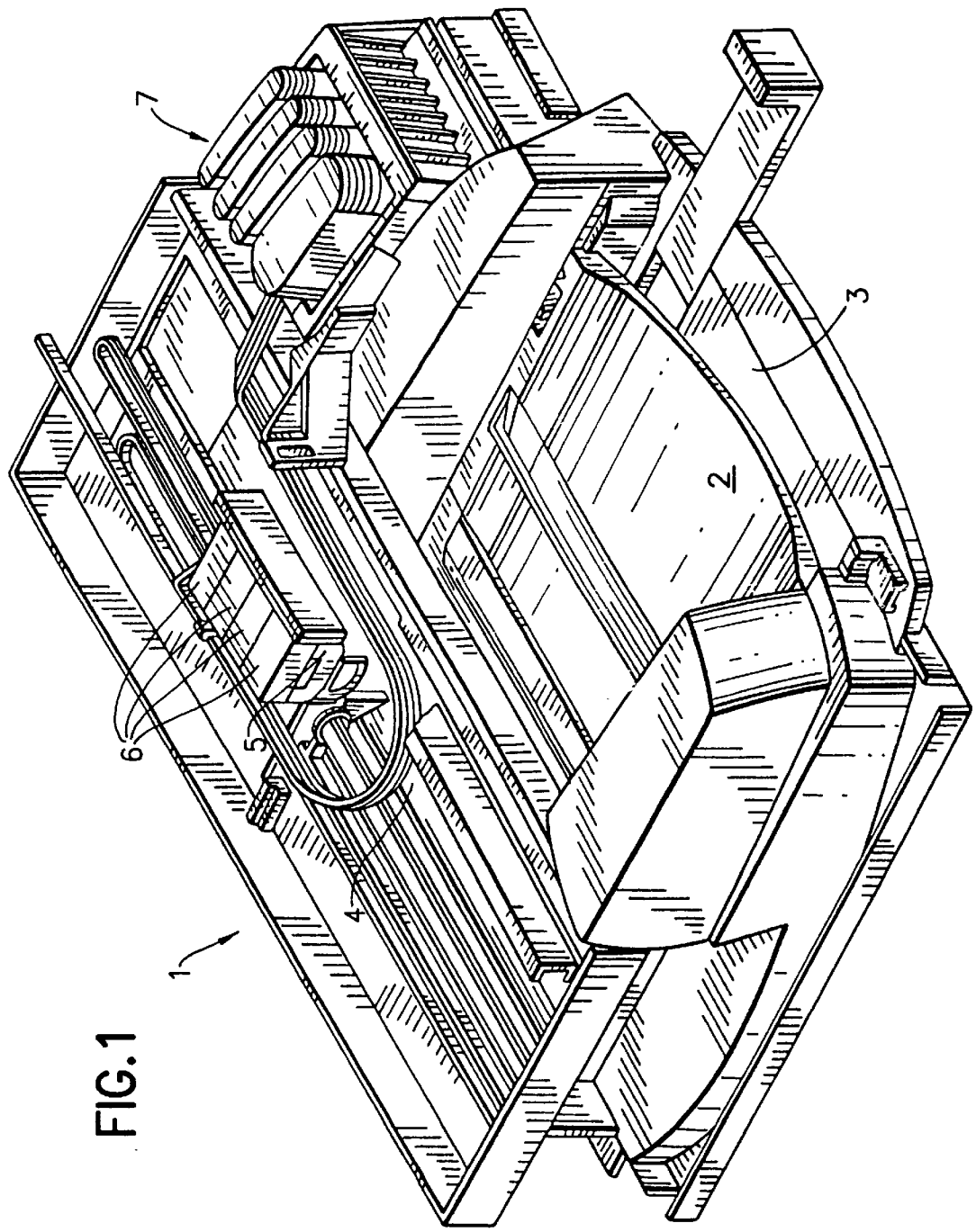
FIG. 1 is a perspective view of an inkjet printer (with cover removed) which incorporates the invention.

FIG. 1 illustrates a perspective view of an inkjet printer 1 which incorporates the invention. A tray 2 holds a supply of input paper or other print media. When a printing operation is initiated, a sheet of paper is fed into printer 1 and is then brought around in a U-direction towards an output tray 3. The sheet is stopped in a print zone 4 and a scanning cartridge 5, containing plural removable color printheads 6 is scanned across the sheet for printing a swath of ink thereon. The process repeats until the entire sheet has been printed, at which point it is ejected onto output tray 3.

Printheads 6 are, respectively, fluidically coupled to four removable ink cartridges 7 holding, for example, cyan, magenta, yellow and black inks, respectively. Since black ink tends to be depleted most rapidly, the black ink cartridge has a larger capacity than the other ink cartridges. As will be understood from the description which follows, each printhead and ink cartridge is provided with an integral memory device which stores data that is used by printer 1 to control its printing operations and to present messages via a display for user review.

Figure 2:
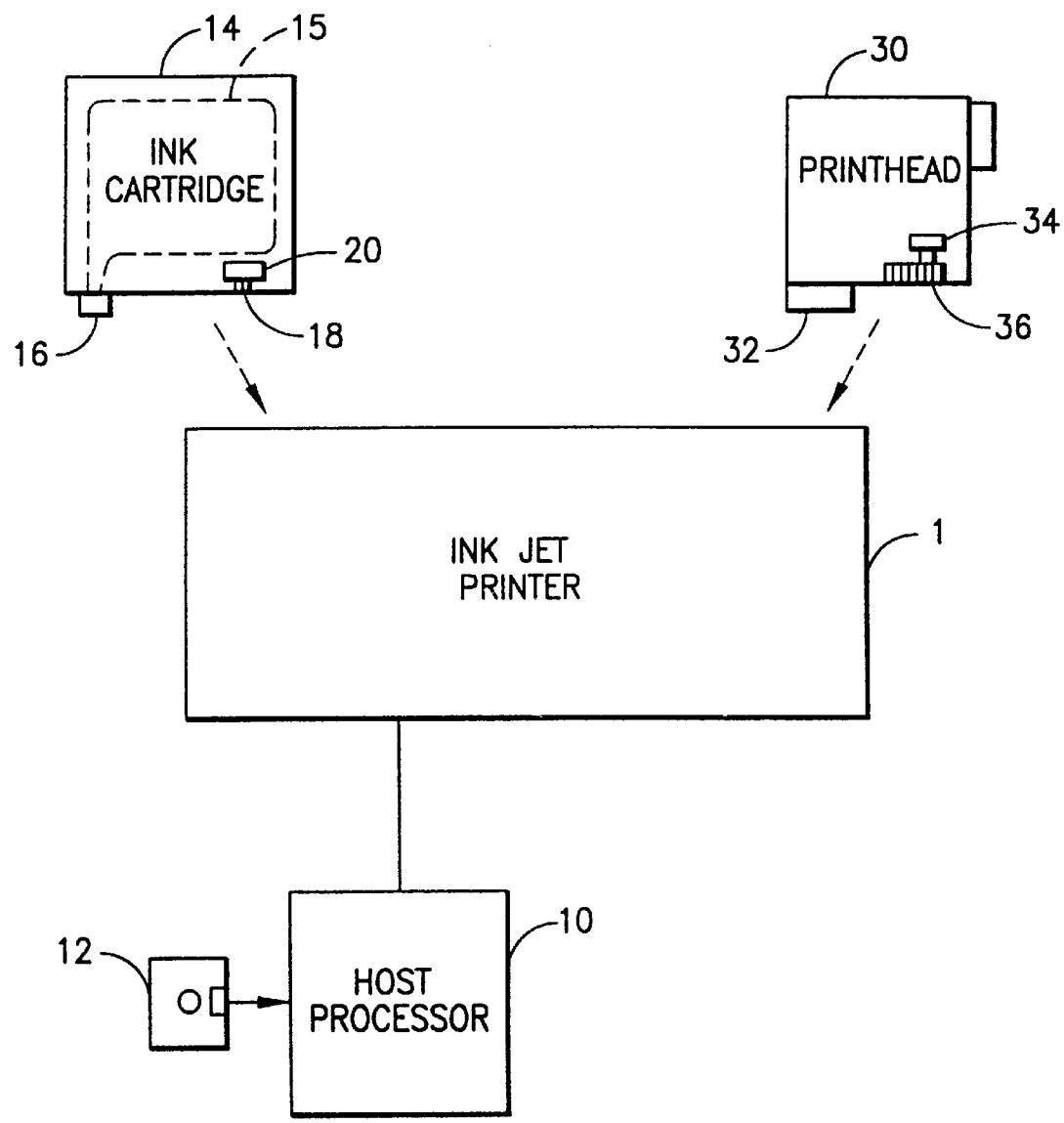
FIG. 2 is a block diagram of the inkjet printer of FIG. 1, showing replaceable elements therefor, including an ink cartridge and a printhead.

In FIG. 2, a host processor 10 connects to inkjet printer 1 and provides both control and data signals therefor. Host processor 10 is adapted, in the known manner, to receive a memory media cassette 12 which includes operating program data for control of inkjet printer 1.

As indicated above, inkjet printer 1 is capable of receiving a plurality of pluggable ink cartridges containing one or more colors for use by the printhead. Ink cartridge 14 includes a reservoir 15 which holds a supply of ink, a fluidic coupler 16 and an electrical connector 18, both of which couple to mating connectors within inkjet printer 1 upon installation of ink cartridge 14. A memory chip 20, installed on ink cartridge 14, is coupled to connector 18 and upon insertion of ink cartridge 14, is electrically coupled to a microprocessor within inkjet printer 1.

A printhead 30 also includes a fluidic coupler region 32, a resident memory 34 and an electrical connector 36 which makes connection to memory 34, as well as other sense and control devices within printhead 30.

Figure 3:
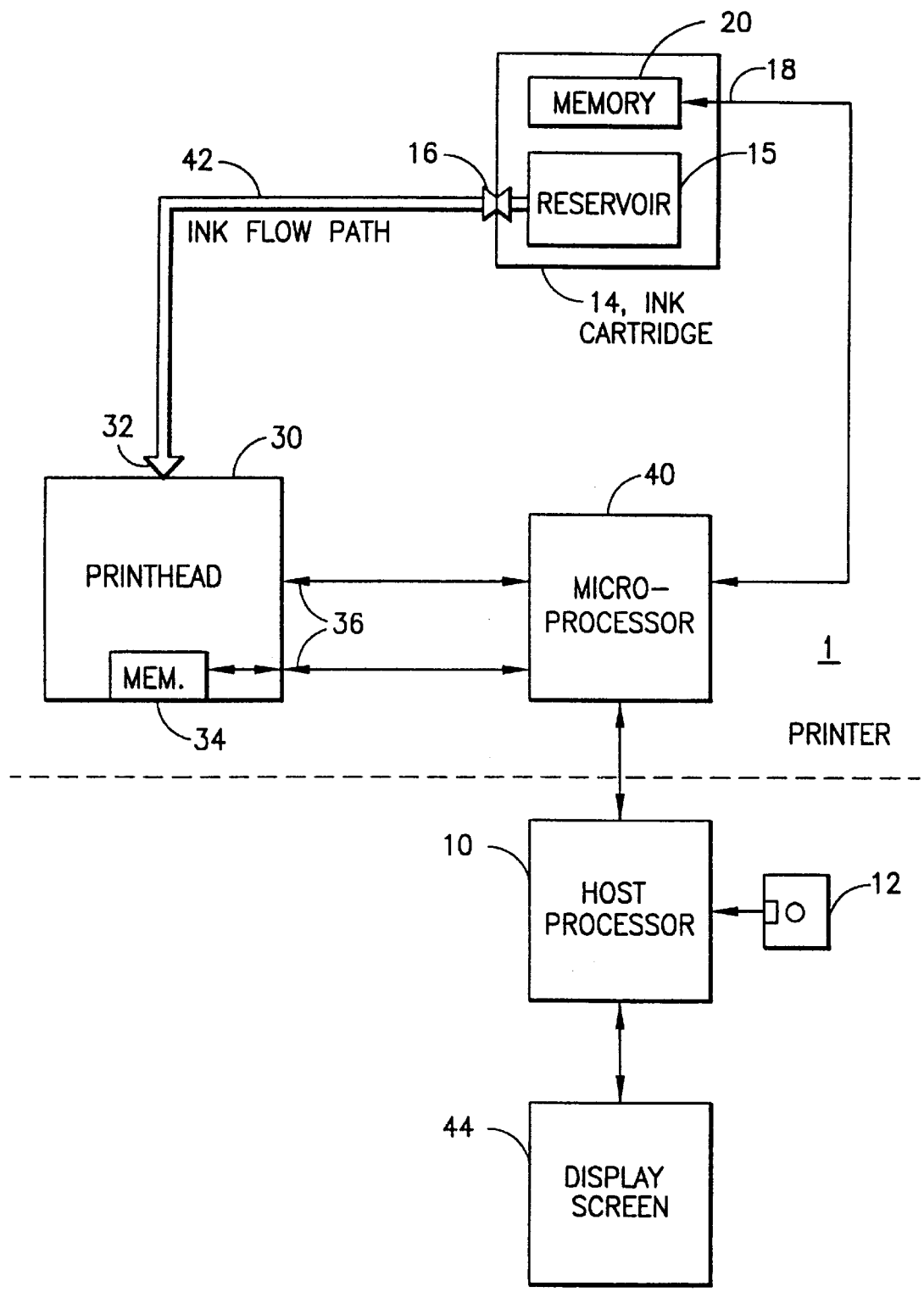
FIG. 3 is a block diagram showing connection of the components within the inkjet printer of FIG. 1.

FIG. 3 illustrates interconnections between a microprocessor 40, which controls the operation of inkjet printer 1, ink cartridge 14 and printhead 30. An ink flow path 42 provides a flow path between ink cartridge 14 and printhead 30.

Memory chip 20 on ink cartridge 14 includes a variety of parameters recorded therein, some of which are specifically derived for use with the specific ink contained within cartridge 14 and others of which are employed, more generally, for control of ink printer 1. Memory chip 20 also includes a further category of data which enables messages to be automatically displayed to a user upon occurrence of either a predetermined event or upon initial installation of ink cartridge 14 into ink printer 1. For example, one such message may be an indication of availability of new printer driver software that is a newer version than the printer driver installed on inkjet printer 1; a message indicating a need for replacement of ink cartridge 14 upon the determination of a low ink level therein and a further display the reorder part number and address from which the part can be ordered; a message regarding a new product offering which is displayed upon initial insertion of ink cartridge 14; or parameters to be used by ink jet printer 1 to control operation of an integral service station therein.

Figure 4:
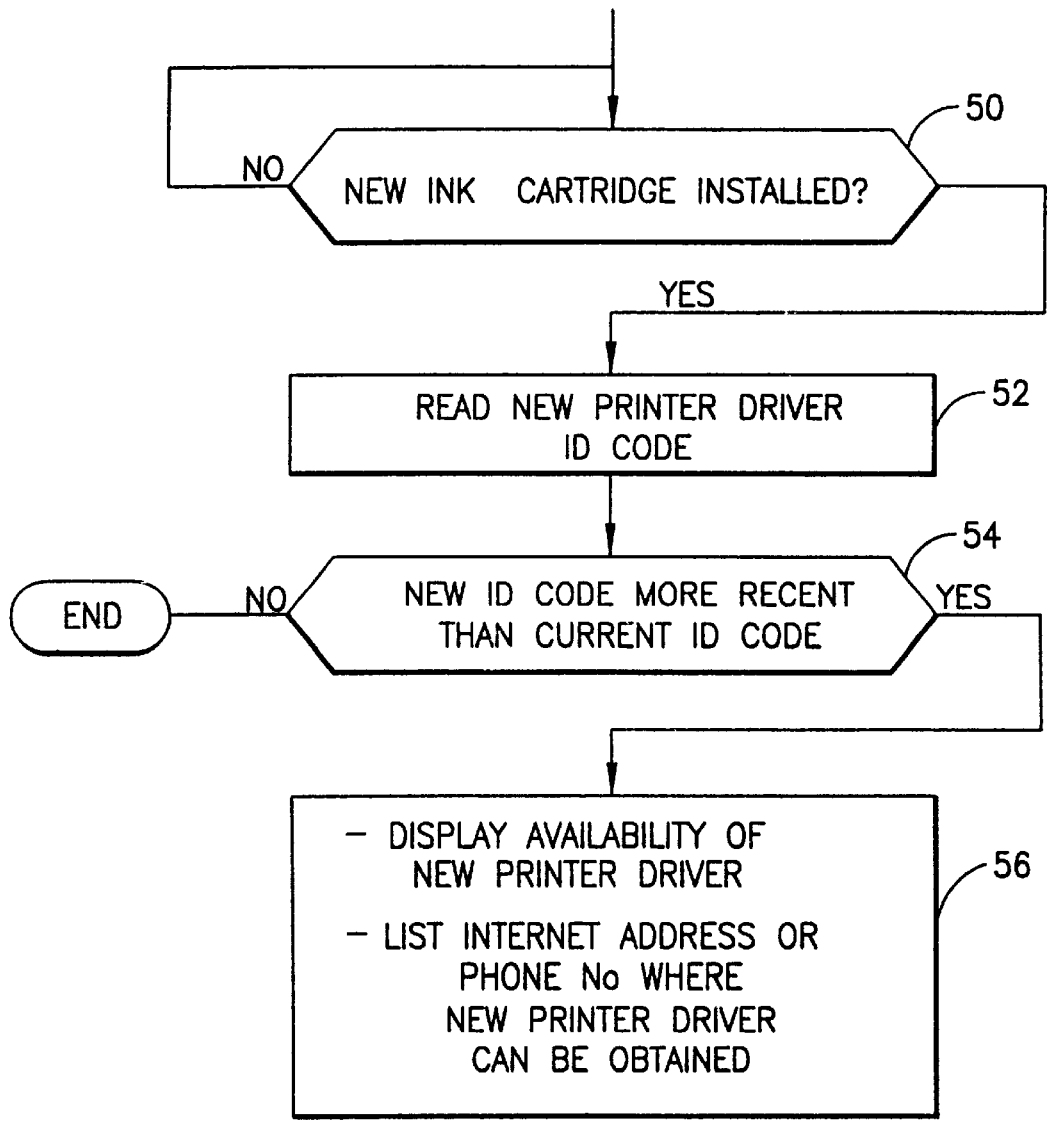
FIG. 4 is a logic flow diagram of the method of the invention which enables display of a driver update message.

Turning to FIG. 4, the logic flow diagram shown therein illustrates the procedure of the invention when memory chip 20 includes a new printer driver identifier code. Upon installation of the new ink cartridge (decision box 50), microprocessor 40 causes the data recorded on memory chip 20 to be read, including any new printer driver identifier code recorded therein (box 52). The new printer driver identifier code is then compared with the identifier code of the current printer driver installed in printer 1 to determine if the new identifier code indicates a more recent printer driver version than the current identifier code. This determination can be readily made by (i) assuring that each identifier code includes a date portion that indicates the date of release of the identifier code, a later released code version being more updated than an earlier released version or (ii) by just assuring that version numbers increase sequentially.

If the new printer driver identifier code is not more recent than the current identifier code, the procedure ends. If, by contrast, the new printer driver identifier code is more recent than the identifier of the current printer driver code, the procedure moves to box 56 wherein a message is displayed on display screen 44, indicating availability of the new printer driver. A listing is may also be provided of either an internet address or a telephone number where the new printer driver can be ordered. Further, the data read from the memory cartridge can automatically cause the printer's host processor to connect to the manufacturer's Internet website, where the user would have the opportunity of directly downloading an updated driver.

All of the above actions take place automatically upon insertion of ink cartridge 14 into ink jet printer 1 and require no action by the user, other than installation of the ink cartridge. Since ink cartridges are replaced relatively often, the printer driver availability message is assured of getting to a targeted group of users who already have an ink jet printer that is adapted to utilize the updated printer driver software.

Figure 5:
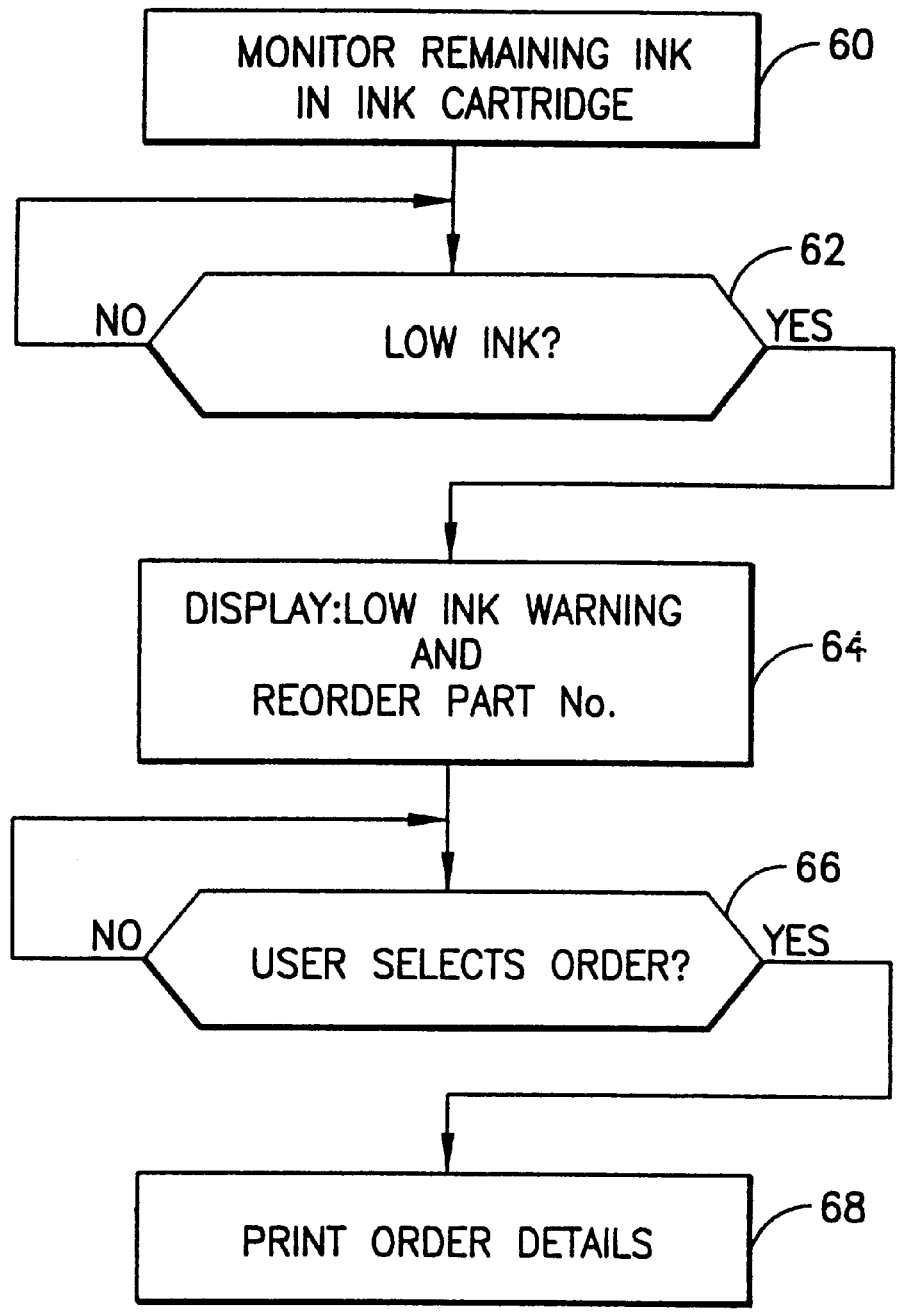
FIG. 5 is a logic flow diagram of the method of the invention which enables display of replaceable module reorder data.

In FIG. 5, a procedure is illustrated which enables printer 1 to display a message indicating a low ink level in ink cartridge 14; to provide a reorder part number; and to print out an order blank upon a customer input. In specific, microprocessor 40 monitors the level of remaining ink in ink cartridge 14 (box 60) on a continuing basis, using an ink level monitor built into the cartridge. Upon occurrence of a low ink indication from the level monitor (decision box 62), microprocessor 40 causes display screen 44 to display a low ink warning and, in addition, a reorder part number. Upon selection by the user of an order option (decision box 66), which may occur by the user "clicking" on the reorder part number indicated on display screen 44, printer 1 is caused to output an order sheet with all of the necessary details to accomplish an order of a replacement ink cartridge (box 68). As further alternatives, an Internet website could be automatically accessed to enable entry of an immediate order; the computer could prompt the user for his/her zip code and then provide information regarding a nearest dealer to contact, etc.

Figure 6:
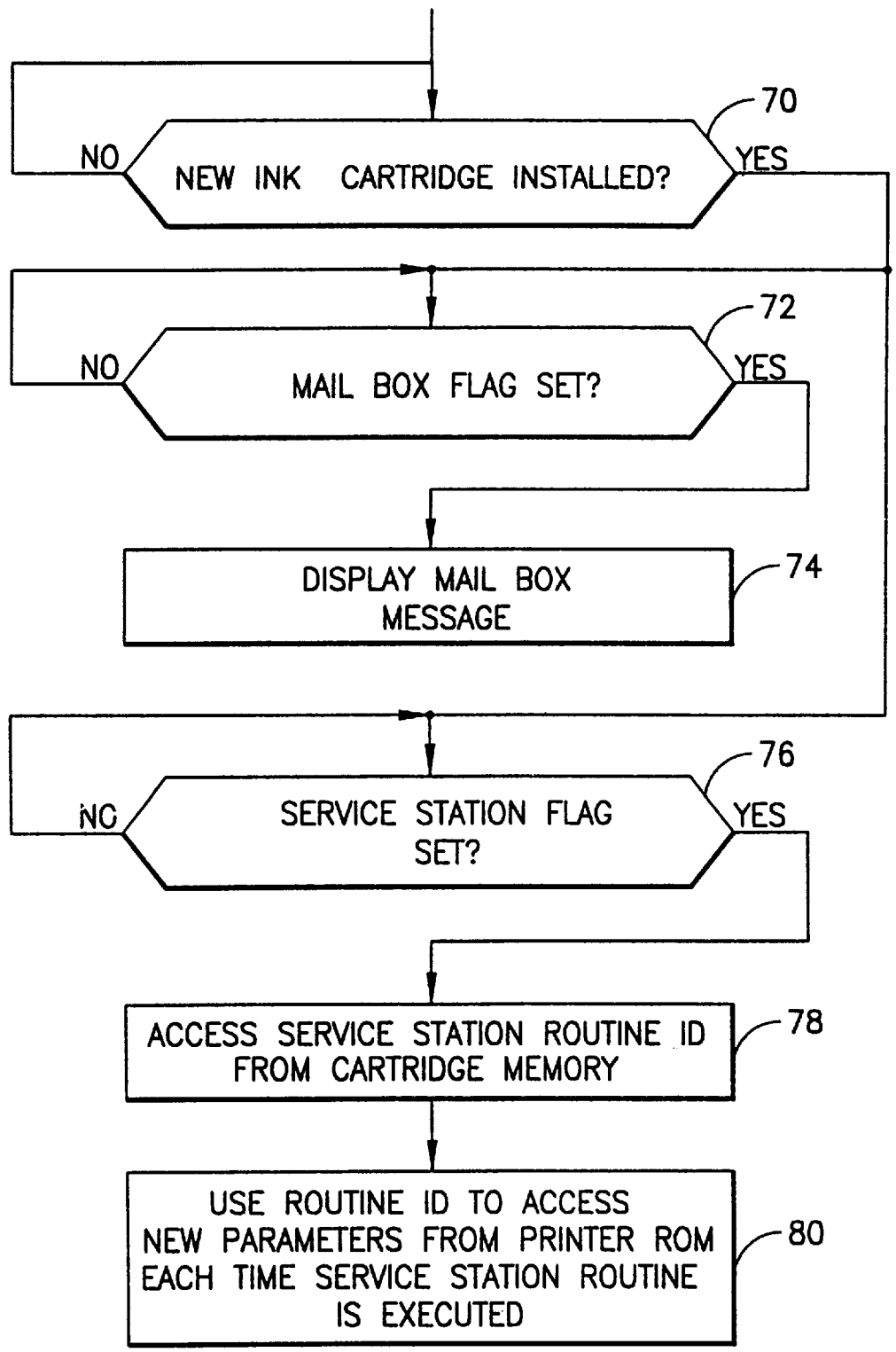
FIG. 6 is a logic flow diagram of the method of the invention which enables either display of a stored message in memory or an input of a data to enable adjustment of an inkjet service station in the inkjet apparatus.

In FIG. 6, several further examples of message/data outputs from memory cartridge 20 are illustrated. When a new ink cartridge is installed (decision box 70), microprocessor determines whether a mailbox flag is or is not set (decision box 73). If the flag is set, a mailbox message may be accessed from memory 20 and displayed on display screen 44 (box 74). The mailbox message may notify the user to contact the manufacturer (over the internet or via telephone) for receipt of a promotion, service, user hints, free offers, additional product offerings, etc.

In addition to causing a message to be displayed for user viewing, the invention also enables data to be downloaded from memory 20 into microprocessor 40, for control of processes within printer 1. As is known to those skilled in the art, an inkjet printer employs a "service" station to enable continued and reliable operation of an inkjet printhead. The service station (not shown in the drawings) provides both a wiping action and a capping action when the printhead is in the park position. Various details of the service station operation are controlled by parameters stored within firmware housed in microprocessor 40.

Thus, as shown in FIG. 6, upon installation of the new ink cartridge (box 70), microprocessor 40 determines whether the service station flag is set in memory 20 (decision box 76). If yes, a service station control procedure identifier is accessed from cartridge memory 20 (box 78). That identifier is then used to address firmware within microprocessor 40 which stores various parameters to be used in conjunction with the operation of the service station. Thereafter, each time a service station requires operation, the new routine identifier is employed to access new parameters for control of the service station operation.

It should be understood that the foregoing description is only illustrative of the invention. Various alternatives and modifications can be devised by those skilled in the art without departing from the invention. For instance, a language designation code can be stored in memory 20 and upon installation, automatically read out. If the driver/user interface in the printer utilizes a different language, a query could be displayed to the user enabling a choice to be made regarding the language of further message displays. Thus if the cartridge is purchased in a Spanish speaking country and used on a printer in an English speaking country, the user will be offered the opportunity to alter the language in which user messages are displayed. Accordingly, the present invention is intended to embrace all such alternatives, modifications and variances which fall within the scope of the appended claims.

What is claimed is:

1. A method for controlling a printing apparatus which employs a pluggable module including a memory, said printing apparatus coupled to a processor/display arrangement, the method comprising the steps of:

determining, upon insertion of said pluggable module, if a driver identifier stored in said memory indicates a more updated driver version than a current driver version used to control said printing apparatus; and if the driver identifier stored in said memory indicates a more updated driver version, communicating to said user an availability of said more updated driver version.

2. The method of claim 1, wherein said pluggable module comprises a replaceable ink cartridge.

3. The method of claim 1, wherein said printing apparatus is an inkjet printer.

4. The method of claim 1, comprising the further step of:

connecting said processor/display arrangement to an internet website to enable acquisition of said updated driver version.

5. The method of claim 4, comprising the further step of:

enabling a download of said updated driver version to said processor/display arrangement.

6. The method of claim 1, wherein said communicating step provides a visual or audio signal via said processor/display arrangement to indicate said availability.

7. A method for controlling an inkjet printing system which employs a pluggable ink cartridge including a memory, said inkjet printing system coupled to a print data source, the method comprising the steps of:

inserting said pluggable ink cartridge into said inkjet printing system so as to enable connection of said memory to said print data source;

monitoring an ink level in said pluggable ink cartridge;

retrieving, upon occurrence of a low ink state, a corresponding data signal from said memory;

communicating, in response to said corresponding data signal, a reorder message to a user of said inkjet apparatus; and upon receiving an indication of a willingness to reorder from said user, further enabling dispatch of an order.

8. The method as recited in claim 7, wherein said further enabling step comprises printing out a sheet with order information.

9. The method as recited in claim 7, wherein said further enabling step comprises providing a list of dealers within a locale from which said pluggable ink cartridge can be obtained.

10. The method as recited in claim 7, wherein said further enabling step comprises coupling a processor/display apparatus which controls said inkjet printing system to an internet website to enable acquisition of said pluggable ink cartridge.

11. A method for communicating to a user of a printing system which employs a pluggable module including a memory, the printing system adapted to couple to a print data source, the method comprising the steps of:

upon occurrence of an event, accessing data from said memory and determining if communication data for causing a message to be communicated is output from said memory; and if such communication data is accessed, automatically communicating said message for user review, without requiring user intervention.

12. The method as recited in claim 11, wherein said event comprises an insertion of said pluggable module into said printing system.

13. A method for updating a printing system, said printing system including a processor that is coupled to a receptacle which includes a connector, said receptacle adapted to receive an ink cartridge with a memory chip mounted thereon, said memory chip having printing system update trigger data encoded thereon, said method comprising the steps of:

a) receiving an ink cartridge in said receptacle so as to connect said memory chip via said connector to said processor;

b) passing said printing system update trigger data encoded on said memory chip to said processor;

c) controlling said processor to compare at least one parameter from said printing system update trigger data to one or more expected parameters; and d) selecting and causing said processor to execute a further procedure in response to the compare action in step c).

14. The method of claim 13, wherein said one parameter corresponds to a printer driver version number.

15. The method of claim 14, wherein step c) compares said printer driver version number to a currently installed printer driver version number.

16. The method of claim 15, wherein step d) comprises communicating a notice to a user of an availability of a more recently revised printer driver version.

17. The method of claim 13, wherein said one parameter corresponds to a value indicative of a mailbox message number.

18. The method of claim 17, wherein step c) causes said processor to compare said value indicative of a mailbox message number to plural stored values and upon a match of values being found, step d) causes communication of a message to a user.

19. The method of claim 13, wherein said one parameter corresponds to a value flag indicative of an inkjet service station procedure.

20. The method of claim 19, wherein step c) compares said value flag indicative of an inkjet service station procedure to a value associated with a currently installed service station procedure.

21. The method of claim 20, wherein said further procedure of step d) comprises the additional steps of:

d1) providing a group of different service station procedures, each procedure associated with a particular value;

d2) choosing a service station procedure associated with a value which matches said value flag; and d3) resetting a currently employed service station procedure in accord with said service station procedure chosen in step d2).

22. The method of claim 13, comprising the further steps of:

estimating remaining ink in said ink cartridge by counting a number of droplet firings of a printhead included in said printing system and updating a count in said memory to indicate a value corresponding to current ink volume in said ink cartridge;

comparing said count to a low ink value and when said count equals or is less than said low ink value, displaying a low ink warning.

23. The method of claim 22, wherein said one parameter corresponds to a reorder part number and step c) causes said processor to compare said reorder part number to at least one stored value and step d) communicates reorder information to the user.

24. An ink cartridge whose installation updates a printing systems, said printing system including a processor that is electrically coupled to a receptacle which includes a connector, said printing system having a printhead that ejects ink onto media, said ink cartridge comprising:

a housing adapted to be releasably mounted in said receptacle, said housing containing an ink reservoir; and a memory element that couples to said connector when said housing is releasably mounted to said receptacle, said memory element storing notification data that includes at least one parameter, said memory element providing said notification data to said processor, said processor executing a parameter checking algorithm that compares said at least one parameter to expected parameters, and executing a further procedure in response to said comparison.

25. The ink cartridge of claim 24, wherein said parameter corresponds to a printer driver revision number.

26. The ink cartridge of claim 24, wherein said parameter corresponds to a value indicative of a mailbox message number.

27. The ink cartridge of claim 24, wherein said parameter corresponds to a value flag indicative of an inkjet service station procedure.

28. The ink cartridge of claim 24, wherein said parameter corresponds to a reorder flag.

29. A replaceable module whose installation into a printing system provides an end user with a message, said printing system including a print data source, said pluggable module comprising:

a memory element;

connector means for coupling said memory element to a processor in said printing system, said memory element including parameters which, upon being automatically accessed by said processor, cause a message to be communicated for user review, without requiring user intervention.

30. The replaceable module as in claim 29, wherein said replaceable module comprises a replaceable ink container for an inkjet printing system.

31. The replaceable module as in claim 30, further comprising ink that is contained within the ink container.

32. The replaceable module as in claim 29, wherein a subject matter of said message is unrelated to the printing system.

33. The replaceable module as in claim 29, wherein said message is encoded on the memory element.

* * * * *